United States Patent
Derawe et al.

(10) Patent No.: US 12,359,050 B2
(45) Date of Patent: Jul. 15, 2025

(54) SHRINKABLE POLYMERS

(71) Applicant: SOLUTUM TECHNOLOGIES LTD, Tel Aviv (IL)

(72) Inventors: Moanes Derawe, Kfar Yasif (IL); Regev Ben Zvi Bechler, Rehovot (IL); Sharon Barak, Tel Aviv-Jaffa (IL)

(73) Assignee: SOLUTUM TECHNOLOGIES LTD, Tel Aviv (IL)

( * ) Notice: Subject to any disclaimer, the term of this patent is extended or adjusted under 35 U.S.C. 154(b) by 0 days.

(21) Appl. No.: 18/724,127

(22) PCT Filed: Dec. 26, 2022

(86) PCT No.: PCT/IL2022/051385
§ 371 (c)(1),
(2) Date: Jun. 25, 2024

(87) PCT Pub. No.: WO2023/126922
PCT Pub. Date: Jul. 6, 2023

(65) Prior Publication Data
US 2025/0092244 A1    Mar. 20, 2025

Related U.S. Application Data

(60) Provisional application No. 63/266,127, filed on Dec. 29, 2021.

(51) Int. Cl.
*C08L 29/04* (2006.01)
*C08K 5/053* (2006.01)

(52) U.S. Cl.
CPC .............. *C08L 29/04* (2013.01); *C08K 5/053* (2013.01); *C08L 2203/162* (2013.01); *C08L 2205/025* (2013.01); *C08L 2205/035* (2013.01); *C08L 2205/06* (2013.01); *C08L 2312/00* (2013.01)

(58) Field of Classification Search
CPC .............................. C08L 29/04; C08L 2205/03
See application file for complete search history.

(56) References Cited

U.S. PATENT DOCUMENTS

| | | | |
|---|---|---|---|
| 4,119,604 A | 10/1978 | Wysong | |
| 5,954,683 A * | 9/1999 | Downs | A61F 13/26 604/15 |
| 2008/0108748 A1 | 5/2008 | Buckley et al. | |
| 2011/0049434 A1* | 3/2011 | Ootsuki | C04B 35/04 525/472 |
| 2011/0186467 A1 | 8/2011 | Denome | |

FOREIGN PATENT DOCUMENTS

| | | | | |
|---|---|---|---|---|
| CN | 106009443 A | 10/2016 | | |
| CN | 107936431 A | 4/2018 | | |
| JP | S5324351 A | 3/1978 | | |
| JP | H06145209 A * | 5/1994 | | |
| JP | 2009279759 A | 12/2009 | | |
| JP | 5507839 B2 * | 5/2014 | ....... | B32B 17/10761 |
| JP | 2018104563 A * | 7/2018 | | |
| WO | 2021028918 A1 | 2/2021 | | |

OTHER PUBLICATIONS

X. Tang, S. Alavi, Recent advances in starch, polyvinyl alcohol based polymer blends, nanocomposites and their biodegradability (Review), Carbohydrate Polymers, 85, 7-16, 2011 (Available online Jan. 28, 2011), doi: 10.1016/j.carbpol.2011.01.030.

* cited by examiner

*Primary Examiner* — Richard A. Huhn
(74) *Attorney, Agent, or Firm* — FISHERBROYLES, LLP; Roger L. Browdy

(57) ABSTRACT

The technology disclosed herein generally concerns polymeric compositions and shrink products made therefrom which comprise a plurality of different PVOH grades.

12 Claims, No Drawings

SHRINKABLE POLYMERS

TECHNOLOGICAL FIELD

The invention generally contemplates a novel family of polymer compositions for manufacturing water-soluble and biodegradable shrinkable films.

BACKGROUND OF THE INVENTION

Shrink polymer films are a family within polymer flexible films used for the packaging of finished goods. Heat applied to the film causes the film to shrink tightly around the item placed within. This process results in a clear, durable barrier of protection around the product. Thermally driven shrinking of polymers may be explained by a memory effect, meaning that when oriented and cooled polymers are heated, they will revert to their initial relaxed configuration causing the film to shrink.

GENERAL DESCRIPTION

The inventors of the technology disclosed here have developed a unique group of ecofriendly polymeric compositions having a distinctive ability to be processed into films with surprisingly outstanding shrink properties, and thus may be implemented in a variety of products such as shrink wrap products, shrink labels and others. Films of the invention have been also configured to exhibit facile and effective biodegradation in water, thus reducing environmental contamination. This ability to provide intimate functional barriers around goods of various uses, while being environmentally friendly, renders unique and commercially desirable polymers or polymeric compositions of the invention.

Polymeric compositions of the invention are based on a combination of different grades of polyvinyl alcohol (PVOH), wherein each grade in the composition differs from another in at least one property selected from degree of polymerization and degree of hydrolysis. Out of the very many PVOH grades commercially available or which are being formed by synthesis, the inventors propose use of a specific combination of PVOH grades which enables production of a variety of polymeric products differing in their shrinkage capabilities and in their water-derived decomposability. Polymeric films or sheets manufactured from compositions of the invention exhibited up to 85% shrinkage upon thermal treatment.

Thus, in a first aspect there is provided a polymeric composition or polymeric blend comprising at least one plasticizer and PVOH, wherein the PVOH is a combination of two or more PVOH grades, each having a degree of hydrolysis ranging between 86 and 99% and a degree of polymerization ranging between 500 and 3000.

The PVOH grades used in accordance with the invention are referred to as PVOH grade of type 1, PVOH grade of type 2, and PVOH grade of type 3, wherein PVOH grade of type 1 having a degree of hydrolysis between 98 and 99% and a degree of polymerization of between about 800 and 1700;

PVOH grade of type 2 has a degree of hydrolysis between 86 and 89% and a degree of polymerization of between about 1400 and 2600; and PVOH grade of type 3 has a degree of hydrolysis between 86 and 89% and a degree of polymerization of between 500 and 800.

The selection of the grades may be amongst any specific grade type or amongst the various grade types.

In some embodiments, the composition comprises three or more PVOH grades.

In some embodiments, three of the PVOH grades are:

PVOH grade of type 1 having a degree of hydrolysis between 98 and 99% and a degree of polymerization of between about 800 and 1700;

PVOH grade of type 2 has a degree of hydrolysis between 86 and 89% and a degree of polymerization of between about 1400 and 2600; and PVOH grade of type 3 has a degree of hydrolysis between 86 and 89% and a degree of polymerization of between 500 and 800.

The invention further provides a composition or a blend or a mixture comprising three or more PVOH grades selected from:

PVOH grade of type 1 comprising PVOH having a degree of hydrolysis between 98 and 99% and a degree of polymerization of between about 800 and 1700;

PVOH grade of type 2 comprising PVOH having a degree of hydrolysis between 86 and 89% and a degree of polymerization of between about 1400 and 2600; and PVOH grade of type 3 comprising PVOH having a degree of hydrolysis between 86 and 89% and a degree of polymerization of between 500 and 800.

In some embodiments, the composition comprises a blend or a mixture comprising three or more PVOH grades selected from types 1, 2 and/or 3.

In some embodiments, the composition comprises a blend or a mixture comprising three or more PVOH grades selected from type 1.

In some embodiments, the composition comprises a blend or a mixture comprising three or more PVOH grades selected from type 2.

In some embodiments, the composition comprises a blend or a mixture comprising three or more PVOH grades selected from type 3.

In some embodiments, the composition comprises a blend or a mixture comprising one or more PVOH selected from grade type 1, one or more PVOH selected from grade type 2 and one or more PVOH selected from grade type 3.

In some embodiments, the composition comprises a blend or a mixture comprising one or more PVOH selected from grade type 1 having a molecular weight of between 35 and 75 KDa;

one or more PVOH selected from grade type 2 having a molecular weight of between 60 and 120 KDa; and one or more PVOH selected from grade type 3 having a molecular weight of between 22 and 35 KDa.

In some embodiments, a solution of 4 wt % PVOH grade type 1 measured at 20° C. has a viscosity 8-30 cPs; a solution of 4 wt % PVOH grade type 2 measured at 20° C. has a viscosity of 11 and 58 cPs and a solution of 4 wt % PVOH type 3 measured at 20° C. has a viscosity of 5-10 Cps.

In some embodiments, the composition comprises a blend of two or more of the PVOH grades referred to as PVOH grade type 1, PVOH grade type 2 and PVOH grade type 3, as listed in Table 1:

TABLE 1

PVOH grades used according to the invention

|  | PVOH grade type 1 | PVOH grade type 2 | PVOH grade type 3 |
|---|---|---|---|
| Degree of hydrolysis | Between 98 and 99 | Between 86 and 89 | Between 86 and 89 |
| Degree of polymerization | Between 800 and 1700 | Between 1400 and 2600 | Between 500 and 800 |
| Molecular weight, kDa | Between 35 and 75 | Between 60 and 120 | Between 22 and 35 |
| Viscosity, 4%, 20° C., cps | Between 8 and 30 | Between 11 and 58 | Between 5 and 10 |

The at least one "plasticizer" present in compositions of the invention is a compound used to increase the fluidity or plasticity of the polymeric composition of the invention. The at least one plasticizer is selected amongst such materials capable of reducing the glass transition temperature and melting point of the polymeric composition under melt extrusion. Without wishing to be bound by theory, the plasticizer used may also decrease the melt viscosity of the melted composition, tensile strength, hardness, density and increase parameters such as elongation at break, toughness and dielectric constant.

The at least one plasticizer used is generally compatible with PVOH, to enable mixing with no re-crystallization after mixing and formulation. The plasticizer is one which is stable under hot melt extrusion condition and sufficiently lubricating and stable in the final compounding product and film.

The at least one plasticizer may be selected from glycerol, sorbitol, a propylene glycol, a polyethylene glycol, and the like, as well as any combination thereof.

In some embodiments, the at least one plasticizer is glycerol.

In some embodiments, the composition comprising a blend of PVOH grade types, as disclosed herein, at least one crosslinking compound, at least one additional bioplastic and optionally at least one additive.

In some embodiments, the composition comprising a blend of PVOH grade types, as disclosed herein, at least one additional bioplastic, at least one additive and further optionally at least one crosslinking compound.

In some embodiments, the composition comprising a blend of PVOH grade types, as disclosed herein, at least one crosslinking compound, at least one additional bioplastic and at least one additive.

In some embodiments, the composition comprising the blend of PVOH grade types, as disclosed herein, further comprises a) at least one crosslinking compound being present in an amount ranging between 0 or 0.1 and 20 wt %; wherein the amount of the crosslinking agent may be between 0.1 and 15, 0.1 and 10, 0.1 and 9, 0.1 and 8, 0.1 and 7, 0.1 and 6, 0.1 and 5, 0.1 and 4, 0.1 and 3, 0.1 and 2, 0.1 and 1, 1 and 20, 1 and 19, 1 and 18, 1 and 17, 1 and 16, 1 and 15, 1 and 14, 1 and 13, 1 and 12, 1 and 11, 1 and 10, 0.1 and 0.5 wt % or the amount may be 1, 2, 3, 4, 5, 6, 7, 8, 9, 10, 11, 12, 13, 14, 15, 16, 17, 18, 19 or 20 wt %;

b) at least one additional bioplastic being optionally present in an amount ranging between 0.1 and 50 wt %; wherein the amount of the bioplastic may be between 0.1 and 45, 0.1 and 40, 0.1 and 35, 0.1 and 30, 0.1 and 25, 0.1 and 20, 0.1 and 15, 0.1 and 10, 0.1 and 7, 0.1 and 5, 0.1 and 1, 1 and 50, 1 and 40, 1 and 30, 1 and 20, 1 and 10, 1 and 5, 10 and 50, 10 and 40, 10 and 30, or between 10 and 20 wt %; and c) at least one additive, in an amount ranging between 0.1 and 20 wt %; wherein the amount of the additive may be between 0.1 and 15, 0.1 and 10, 0.1 and 9, 0.1 and 8, 0.1 and 7, 0.1 and 6, 0.1 and 5, 0.1 and 4, 0.1 and 3, 0.1 and 2, 0.1 and 1, 1 and 20, 1 and 19, 1 and 18, 1 and 17, 1 and 16, 1 and 15, 1 and 14, 1 and 13, 1 and 12, 1 and 11, 1 and 10, 0.1 and 0.5 wt % or the amount may be 1, 2, 3, 4, 5, 6, 7, 8, 9, 10, 11, 12, 13, 14, 15, 16, 17, 18, 19 or 20 wt %.

The amount of the PVOH grades, combined, may be between 30 and 99 wt %. In some embodiments, the amount may be between 30 and 95, 30 and 90, 30 and 85, 30 and 80, 30 and 75, 30 and 70, 30 and 65, 30 and 60, 30 and 55, 30 and 50, 30 and 45, 30 and 40, 30 and 35, 40 and 95, 45 and 95, 50 and 95, 55 and 95, 60 and 95, 65 and 95, 70 and 95, 75 and 95, 80 and 95, or may be between 85 and 95 wt %.

The amount of the PVOH grades, combined, may be between 30 and 99 wt %. In some embodiments, the amount may be between 30 and 95, 30 and 90, 30 and 85, 30 and 80, 30 and 75, 30 and 70, 30 and 65, 30 and 60, 30 and 55, 30 and 50, 30 and 45, 30 and 40, 30 and 35, 40 and 95, 45 and 95, 50 and 95, 55 and 95, 60 and 95, 65 and 95, 70 and 95, 75 and 95, 80 and 95, or may be between 85 and 95 wt %.

The amount of each of the PVOH grades in a combination of PVOH grades may be between 10 and 80 wt %. In some embodiments, the amount may be between 10 and 55, 10 and 50, 10 and 45, 10 and 40, 10 and 35, 10 and 30, 10 and 25, 10 and 20, 10 and 15, 20 and 60, 20 and 55, 20 and 50, 20 and 45, 20 and 40, 20 and 35, 20 and 30, 30 and 60, 30 and 50, 30 and 40, 40 and 60, 40 and 50, 50 and 60, or may be 10, 20, 30, 35, 36, 37, 40, 47, 53, 57, 61, 70 or 79 wt %.

The total amount of any PVOH grade combination used in compositions of the invention should be between 30 and 99 wt %, as disclosed herein. Thus, the amount of each grade type making up a combination of PVOH grade types is selected not to exceed this amount range.

Thus, in accordance with another aspect there is provided a composition comprising a) two or more, and at times three or more PVOH grades, optionally in an amount ranging between 30 and 99 wt %;

b) at least one crosslinking compound being present in an amount ranging between 0 or 0.1 and 20 wt %;

c) at least one additional bioplastic being optionally present in an amount ranging between 0.1 and 50 wt %; and d) at least one additive in an amount ranging between 0.1 and 20 wt %.

In some embodiments, the three or more PVOH grades are selected from:

PVOH grade type 1 characterized by one or more of
  (i) a degree of hydrolysis between 98 and 99%;
  (ii) a degree of polymerization of between about 800 and 1700; and
  (iii) a molecular weight of between 35 and 75 KDa;

PVOH grade type 2 characterized by one or more of
  (i) a degree of hydrolysis between 86 and 89%;
  (ii) a degree of polymerization of between about 1400 and 2600; and
  (iii) a molecular weight of between 60 and 120 KDa;

PVOH grade type 3 characterized by one or more of
  (i) a degree of hydrolysis between 86 and 89%;
  (ii) a degree of polymerization of between 500 and 800; and
  (iii) a molecular weight of between 22 and 35 KDa.

In some embodiments, the three or more PVOH grades are selected from PVOH grade type 1 characterized by one or more of
  (i) a degree of hydrolysis between 98 and 99%;
  (ii) a degree of polymerization of between about 800 and 1700; and
  (iii) a molecular weight of between 35 and 75 KDa.

In some embodiments, the three or more PVOH grades are selected from PVOH grade type 2 characterized by one or more of
  (i) a degree of hydrolysis between 86 and 89%;
  (ii) a degree of polymerization of between about 1400 and 2600; and
  (iii) a molecular weight of between 60 and 120 KDa.

In some embodiments, the three or more PVOH grades are selected from PVOH grade type 3 characterized by one or more of
  (i) a degree of hydrolysis between 86 and 89%;
  (ii) a degree of polymerization of between 500 and 800; and
  (iii) a molecular weight of between 22 and 35 KDa.

In some embodiments, the three or more PVOH grades comprise
  at least one PVOH grade type 1 characterized by one or more of
    (i) a degree of hydrolysis between 98 and 99%;
    (ii) a degree of polymerization of between about 800 and 1700; and
    (iii) a molecular weight of between 35 and 75 KDa;
  at least one PVOH grade type 2 characterized by one or more of
    (i) a degree of hydrolysis between 86 and 89%;
    (ii) a degree of polymerization of between about 1400 and 2600; and
    (iii) a molecular weight of between 60 and 120 KDa;
  at least one PVOH grade type 3 characterized by one or more of
    (i) a degree of hydrolysis between 86 and 89%;
    (ii) a degree of polymerization of between 500 and 800; and
    (iii) a molecular weight of between 22 and 35 KDa.

In some embodiments, the three or more PVOH grades comprise
  a single PVOH of grade type 1 characterized by one or more of
    (i) a degree of hydrolysis between 98 and 99%;
    (ii) a degree of polymerization of between about 800 and 1700; and
    (iii) a molecular weight of between 35 and 75 KDa;
  a single PVOH of grade type 2 characterized by one or more of
    (i) a degree of hydrolysis between 86 and 89%;
    (ii) a degree of polymerization of between about 1400 and 2600; and
    (iii) a molecular weight of between 60 and 120 KDa;
  a single PVOH of grade type 3 characterized by one or more of
    (i) a degree of hydrolysis between 86 and 89%;
    (ii) a degree of polymerization of between 500 and 800; and
    (iii) a molecular weight of between 22 and 35 KDa.

In some embodiments, the composition comprises three PVOH grades:
  a single PVOH of grade type 1 characterized by one or more of
    (i) a degree of hydrolysis between 98 and 99%;
    (ii) a degree of polymerization of between about 800 and 1700; and
    (iii) a molecular weight of between 35 and 75 KDa;
  a single PVOH of grade type 2 characterized by one or more of
    (i) a degree of hydrolysis between 86 and 89%;
    (ii) a degree of polymerization of between about 1400 and 2600; and
    (iii) a molecular weight of between 60 and 120 KDa;
  a single PVOH of grade type 3 characterized by one or more of
    (i) a degree of hydrolysis between 86 and 89%;
    (ii) a degree of polymerization of between 500 and 800; and
    (iii) a molecular weight of between 22 and 35 KDa.

In some embodiments, the composition comprises three PVOH grades:
  a single PVOH of grade type 1 characterized by
    (i) a degree of hydrolysis between 98 and 99%;
    (ii) a degree of polymerization of between about 800 and 1700; and
    (iii) a molecular weight of between 35 and 75 KDa;
  a single PVOH of grade type 2 characterized by
    (i) a degree of hydrolysis between 86 and 89%;
    (ii) a degree of polymerization of between about 1400 and 2600; and
    (iii) a molecular weight of between 60 and 120 KDa;
  a single PVOH of grade type 3 characterized by
    (i) a degree of hydrolysis between 86 and 89%;
    (ii) a degree of polymerization of between 500 and 800; and
    (iii) a molecular weight of between 22 and 35 KDa.

In some embodiments, the composition comprises
  (a) three PVOH grades:
    a single PVOH of grade type 1 characterized by
      (i) a degree of hydrolysis between 98 and 99%;
      (ii) a degree of polymerization of between about 800 and 1700; and
      (iii) a molecular weight of between 35 and 75 KDa;
    a single PVOH of grade type 2 characterized by
      (i) a degree of hydrolysis between 86 and 89%;
      (ii) a degree of polymerization of between about 1400 and 2600; and
      (iii) a molecular weight of between 60 and 120 KDa;
    a single PVOH of grade type 3 characterized by
      (i) a degree of hydrolysis between 86 and 89%;
      (ii) a degree of polymerization of between 500 and 800; and
      (iii) a molecular weight of between 22 and 35 KDa;
  (b) at least one crosslinking compound,
  (c) optionally at least one additional bioplastic and
  (d) optionally at least one additive.

In some embodiments, the composition comprises
  (a) three PVOH grades:
    a single PVOH of grade type 1 characterized by
      (i) a degree of hydrolysis between 98 and 99%;
      (ii) a degree of polymerization of between about 800 and 1700; and
      (iii) a molecular weight of between 35 and 75 KDa;

a single PVOH of grade type 2 characterized by
  (i) a degree of hydrolysis between 86 and 89%;
  (ii) a degree of polymerization of between about 1400 and 2600; and
  (iii) a molecular weight of between 60 and 120 KDa;
a single PVOH of grade type 3 characterized by
  (i) a degree of hydrolysis between 86 and 89%;
  (ii) a degree of polymerization of between 500 and 800; and
  (iii) a molecular weight of between 22 and 35 KDa.
(b) at least one additional bioplastic,
(c) at least one additive and
(d) at least one crosslinking compound.

In some embodiments, the crosslinking compound is a compound capable of associating to or crosslinking with any of the PVOH grades present in the composition. The crosslinking compound is selected from polymers, copolymers and nonpolymeric materials, each of which having a functionality capable of associating to OH functionality present on the PVOH backbone.

The crosslinking or association is typically through the formation of covalent bonds. In other instances, the association may be physical, namely wherein chains of the polymers entangle. In some embodiments, the association is by formation of hydrogen bonding and/or ionic association. Notwithstanding the type of association, the crosslinking molecule is selected to provide an association which results in a desired physico-mechanical profile.

The functionality on the crosslinking compound, enabling association with the PVOH may be an inherent functionality of the compound, e.g., oligomer or polymer, or a functionality that is grafted or associated or appended with the compound to afford crosslinking capabilities. In some embodiments, the crosslinking compound is provided with a functionality selected from alcohols, epoxides, anhydrides, carboxylic acids, amines, amides, glycidyl functionalities, aldehyde functionalities, esters and others. The crosslinking compound may be a polymer selected amongst ionomers, namely polymers having one or more functionalities capable of forming ionic groups. In some embodiments, the ionomer is a polyacid optionally selected from poly(acrylic acid) (PAA), poly(methacrylic acid) (PMAA) and others.

In some embodiments, the crosslinking compound is a polymer grafted with an anhydride such as maleic anhydride. In some embodiments, the polymer upon which the maleic anhydride is grafted may be selected from polyethylene (PE), poly(lactic acid) (PLA), polycaprolactone (PCL), polyhydroxybutyrate (PHB), poly(butylene adipate-co-terephthalate) (PBAT) and others. In some embodiments, the crosslinking compound is polyethylene-graft-maleic anhydride.

In some embodiments, the crosslinking compound is a polymer having carboxylic acid functionalities. In some embodiments, the polymer is selected from poly(ethylene-co-acrylic acid) (PE-co-AA), poly(ethylene-co-methacrylic acid) (PE-co-MAA), poly(lactide-block-acrylic acid) (PLA-block-AA), PVOH with carboxylic groups, carboxymethyl cellulose (CMC) and others.

In some embodiments, the polymer is poly(ethylene-co-acrylic acid).

In some embodiments, the polymer is a polymer having glycidyl functionalities.

In some embodiments, the at least one crosslinking compound is a copolymer.

In some embodiments, the crosslinking compound is a low-molecular crosslinking compound that is not a polymer, an oligomer or a copolymer. In such embodiments, the compound is typically selected amongst aldehydic compound; carboxylic acid compounds; amine compounds; halogen substituted compounds; and others reactive in the presence of or towards the PVOH.

In some embodiments, the aldehyde compound may be selected amongst monoaldehydes and dialdehydes. In some embodiments, the aldehyde is selected from formaldehyde, glutaraldehyde, glyoxal, malondialdehyde, succindialdehyde, phthalaldehyde and others.

In some embodiments, the carboxylic acid compound is selected amongst monocarboxylic acids, dicarboxylic acids, tricarboxylic acids and higher homologues. These carboxylic acids may alternatively be selected based on the number of carboxylate or basic groups they can form. Thus, in an equivalent fashion, these compounds may be selected amongst monobasic acids, dibasic acids, tribasic acids and higher homologues. In some embodiments, the carboxylic acid compound is selected from citric acid, boric acid, humic acid, phthalic acid, terephthalic acid, malic acid, sulfo-succinic acid, isophthalic acid, aconitic acid, fumaric acid, tartaric acid and others.

The additional bioplastic (or simply "the bioplastic") used in accordance with the invention is a polymer that is different from the other polymeric components used in the composition of the invention, all of which being substantially also bioplastics. The additional bioplastic may be represented by a natural polymer that is produced or derived from natural sources, such as cells of living organisms, plants and other natural sources. Such polymers may be fully natural or partially synthetic, namely derived from nature and chemically modified to structurally modify the natural polymer. The bioplastic used in accordance with the invention may be also represented by a biodegradable or compostable polymer which is partially or fully derived from petrochemical sources.

In some embodiments, the additional bioplastic is selected from polypeptides and polysaccharides.

In some embodiments, the additional bioplastic is selected from aliphatic or aromatic polyesters, co-polyesters or polyesteramides.

In some embodiments, the additional bioplastic is selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) such as polyhydroxybutyrate (PHB).

The cellulose derivative is a crystalline derivative thereof or any other amorphic form of such a material. Non-limiting examples include nanocrystalline cellulose (NCC), microfibrillar cellulose, microcrystalline cellulose (MCC), bacterial cellulose (BC), hydroxypropylmethyl cellulose (HPMC), hydroxypropyl cellulose (HPC), hydroxyethyl cellulose (HEC) and carboxymethyl cellulose (CMC).

The at least one additive used in compositions of the invention may be selected amongst inorganic additives, fillers or reinforcing agents and from low-molecular weight additives (having a molecular weight below 3000 Da), each selected for improving various properties of a product formed from the composition of the invention. Such additives may include processing aids, slip agents, light stabilizers, UV absorbers, flame retardants, antimicrobial agents, antiviral agents, blowing agents, nucleating agents, antioxidants, antiblocking agents, antistatic agents and others.

In some embodiments, the additive is a hygroscopic agent, optionally selected from CaO, $CaCl_2$), LiCl, NaCl, $CaI_2$, $MgCl_2$, $TiO_2$, $CaCO_3$, alumina silicate fillers, $SiO_2$ and others. In some embodiments, the additive is CaO.

In some embodiments, the additive is an inorganic salt comprising a metallic or a non-metallic element. In some embodiments, the inorganic salt is an inorganic salt of a metal selected from alkali metals and alkaline metals. In some embodiments, the inorganic salt is a salt of a transition metal.

Non-limiting examples of inorganic salts include halide salts of a metal selected from Li, K, Ca, Na, Mg, Mn, Zn and others.

The inorganic salts may be halide salts (a halide atom being an anion of the metal cation). In some embodiments, the inorganic salt may be selected from LiCl, NaCl, $CaCl_2$), $CaI_2$ and $MgCl_2$. In some embodiments, the inorganic salt is $CaCl_2$).

In some embodiments, the composition comprises
(a) three or more PVOH grades selected from
    at least one PVOH grade type 1 characterized by one or more of
        (i) a degree of hydrolysis between 98 and 99%;
        (ii) a degree of polymerization of between about 800 and 1700; and
        (iii) a molecular weight of between 35 and 75 KDa;
    at least one PVOH grade type 2 characterized by one or more of
        (i) a degree of hydrolysis between 86 and 89%;
        (ii) a degree of polymerization of between about 1400 and 2600; and
        (iii) a molecular weight of between 60 and 120 KDa;
    at least one PVOH grade type 3 characterized by one or more of
        (i) a degree of hydrolysis between 86 and 89%;
        (ii) a degree of polymerization of between 500 and 800; and
        (iii) a molecular weight of between 22 and 35 KDa;
(b) a crosslinking polymer being optionally poly(ethylene-co-acrylic acid);
(c) a bioplastic selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) such as polyhydroxybutyrate (PHB);
(d) a salt selected from hygroscopic salts and halide salts such as CaO and $CaCl_2$), respectively.

In some embodiments, the composition comprises
(a) three PVOH grades being
    a single PVOH of grade type 1 characterized by one or more of
        (i) a degree of hydrolysis between 98 and 99%;
        (ii) a degree of polymerization of between about 800 and 1700; and
        (iii) a molecular weight of between 35 and 75 KDa;
    a single PVOH of grade type 2 characterized by one or more of
        (i) a degree of hydrolysis between 86 and 89%;
        (ii) a degree of polymerization of between about 1400 and 2600; and
        (iii) a molecular weight of between 60 and 120 KDa;
    a single PVOH of grade type 3 characterized by one or more of
        (i) a degree of hydrolysis between 86 and 89%;
        (ii) a degree of polymerization of between 500 and 800; and
        (iii) a molecular weight of between 22 and 35 KDa;
(b) a crosslinking polymer being optionally poly(ethylene-co-acrylic acid);

(c) a bioplastic selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) such as polyhydroxybutyrate (PHB);
(d) a salt selected from hygroscopic salts and halide salts such as CaO and $CaCl_2$), respectively.

In some embodiments, the composition comprises
(a) three PVOH grades consisting or being:
    a single PVOH of grade type 1 characterized by one or more of
        (i) a degree of hydrolysis between 98 and 99%;
        (ii) a degree of polymerization of between about 800 and 1700; and
        (iii) a molecular weight of between 35 and 75 KDa;
    a single PVOH of grade type 2 characterized by one or more of
        (i) a degree of hydrolysis between 86 and 89%;
        (ii) a degree of polymerization of between about 1400 and 2600; and
        (iii) a molecular weight of between 60 and 120 KDa;
    a single PVOH of grade type 3 characterized by one or more of
        (i) a degree of hydrolysis between 86 and 89%;
        (ii) a degree of polymerization of between 500 and 800; and
        (iii) a molecular weight of between 22 and 35 KDa;
(b) a crosslinking polymer being optionally poly(ethylene-co-acrylic acid);
(c) a bioplastic selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) such as polyhydroxybutyrate (PHB);
(d) a salt selected from hygroscopic salts and halide salts such as CaO and $CaCl_2$), respectively.

In some embodiments, the composition comprises
(a) a single PVOH of grade type 1 characterized by
    (i) a degree of hydrolysis between 98 and 99%;
    (ii) a degree of polymerization of between about 800 and 1700; and
    (iii) a molecular weight of between 35 and 75 KDa;
(b) a single PVOH of grade type 2 characterized by
    (i) a degree of hydrolysis between 86 and 89%;
    (ii) a degree of polymerization of between about 1400 and 2600; and
    (iii) a molecular weight of between 60 and 120 KDa;
(c) a single PVOH of grade type 3 characterized by
    (i) a degree of hydrolysis between 86 and 89%;
    (ii) a degree of polymerization of between 500 and 800; and
    (iii) a molecular weight of between 22 and 35 KDa;
(d) a crosslinking polymer being optionally poly(ethylene-co-acrylic acid);
(e) a bioplastic selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) such as polyhydroxybutyrate (PHB);
(f) a salt selected from hygroscopic salts and halide salts such as CaO and $CaCl_2$), respectively.

As used herein, a "PVOH grade" refers to different forms of poly(vinyl alcohol) (PVOH) that can be presented in compositions of the invention. As known in the art, PVOH is a highly hydrophilic water-soluble polymer, which can be obtained in different degrees of hydrolysis or different degrees of hydroxylation or different degrees of ethylene content or different degrees of polymerization, hence different molecular weights, and different viscosities. Each of these variables determines the material physical, chemical and mechanical properties and thus determines the different grade types of the PVOH material. Within the context of the invention disclosed herein, one grade is differentiated from another in at least one of (i) degree of hydrolysis, (ii) degree of polymerization, reflecting on the molecular weight and (iii) viscosity.

Compositions of the invention may comprise a blend of PVOH grades or grade types. In other words, compositions of the invention comprise two or more, or three or more grades of PVOH. Three PVOH grade types may be used as stock for preparing compositions and products of the invention. Each of the different grade types, herein referred to as grade type 1, grade type 2 and grate type 3, constitutes a group of different PVOH materials defined by the indicated properties, and thus each individually may be used to formulate compositions of the invention. Accordingly, a blend of PVOH grades, comprising at least 2 or 3 or more PVOH grades may be derived from PVOH grades of type 1, PVOH grade of type 2, or PVOH grades of type 3 or mixtures of the various PVOH grade types. For example, where a blend comprises three different PVOH grades, all three may be selected from the same grade type, e.g., grade type 1, provided that each of the three differs in at least one of (i) degree of hydrolysis, (ii) degree of polymerization, or molecular weight and (iii) viscosity. Similarly, the three grades may be selected from different grade types.

The primary raw material used in the manufacture of polyvinyl alcohol is vinyl acetate monomer. PVOH is manufactured by the polymerization of vinyl acetate followed by partial or full hydrolysis. The process of hydrolysis is based on the partial or full replacement of an ester group in vinyl acetate with a hydroxyl group via a process of saponification. The "degree of hydrolysis" is determined by the time point at which the saponification reaction is stopped. Thus, PVOH can be classified into partially hydrolyzed and fully hydrolyzed forms. PVOH grades used according to the invention are partially hydrolyzed, some are fully hydrolyzed. Generally speaking, the degree of hydrolysis ranges between 86 and 99% (mol %). In other words, between 86 to 99% of the acetate groups are saponified and converted into hydroxyl groups and between 1 and 14% of the acetate groups remain present. It is to be noted that 99% hydrolysis is considered in some cases full hydrolysis.

The "degree of polymerization" of PVOH generally reflects on the molecular weight of the material and may be indicated by a viscosity-average degree of polymerization derived from the viscosity in water.

As stated herein, each of the PVOH grades is selected to have a degree of hydrolysis with the range between 86 and 99 mol % and a degree of polymerization within the range between 500 and 3000. In some embodiments, the degree of polymerization is within the range between 500 and 2600.

The invention also provides formulations according to the invention, as listed in Table 2:

TABLE 2

Some of the values used in Table 2 have been rounded up or down, as acceptable; thus the total amount of components in some of the compositions may exceed 100%.

| Component Family | | | | | | |
|---|---|---|---|---|---|---|
| A | | | B | C | D | |
| Component | | | | | | |
| PVOH | | | X-linker | Bioplastic | Additive | |
| Component spec | | | | | | |
| | PVOH 3 (wt %) | PVOH 2 (wt %) | PVOH 1 (wt %) | PAA (wt %) | PEO (wt %) | Glycerol (wt %) |
| Composition 1 | 37 | 30 | 20 | 0.1 | 0.4 | 13 |
| 2 | 35 | 30 | 20 | 0.1 | 0.4 | 15 |
| 3 | 30 | 30 | 20 | 0.1 | 0.4 | 19 |
| 4 | 79 | 10 | 0 | 0 | 0 | 11 |
| 5 | 70 | 20 | 0 | 0 | 0 | 10 |
| 6 | 61 | 30 | 0 | 0 | 0 | 9 |
| 7 | 57 | 10 | 20 | 0.1 | 0.4 | 13 |
| 8 | 47 | 20 | 20 | 0.1 | 0.4 | 13 |
| 9 | 37 | 30 | 20 | 0.1 | 0.4 | 13 |
| 10 | 61 | 30 | 0 | 0 | 0 | 9 |
| 11 | 57 | 30 | 0 | 0 | 0 | 13 |
| 12 | 53 | 30 | 0 | 0 | 0 | 18 |
| 13 | 40 | 30 | 20 | 0 | 0 | 10 |
| 14 | 36 | 30 | 20 | 0 | 0 | 14 |

Thus, the invention further provides one or more of the following compositions:
1. A composition comprising 37 wt % PVOH of grade type 3, 30 wt % of PVOH grade type 2, 20 wt % PVOH grade type 1, 0.1 wt % crosslinking agent such as PAA, 0.4 wt % bioplastic such as PEO and 13 wt % glycerol as a plasticizer;
2. A composition comprising 35 wt % PVOH of grade type 3, 30 wt % of PVOH grade type 2, 20 wt % PVOH grade type 1, 0.1 wt % crosslinking agent such as PAA, 0.4 wt % bioplastic such as PEO and 15 wt % glycerol as a plasticizer;
3. A composition comprising 30 wt % PVOH of grade type 3, 30 wt % of PVOH grade type 2, 20 wt % PVOH grade type 1, 0.1 wt % crosslinking agent such as PAA, 0.4 wt % bioplastic such as PEO and 19 wt % glycerol as a plasticizer;
4. A composition comprising 79 wt % PVOH of grade type 3, 10 wt % of PVOH grade type 2, and 11 wt % glycerol as a plasticizer;
5. A composition comprising 70 wt % PVOH of grade type 3, 20 wt % of PVOH grade type 2, and 10 wt % glycerol as a plasticizer;
6. A composition comprising 61 wt % PVOH of grade type 3, 30 wt % of PVOH grade type 2, and 9 wt % glycerol as a plasticizer;
7. A composition comprising 57 wt % PVOH of grade type 3, 10 wt % of PVOH grade type 2, 20 wt % PVOH grade type 1, 0.1 wt % crosslinking agent such as PAA, 0.4 wt % bioplastic such as PEO and 13 wt % glycerol as a plasticizer;
8. A composition comprising 47 wt % PVOH of grade type 3, 20 wt % of PVOH grade type 2, 20 wt % PVOH grade type 1, 0.1 wt % crosslinking agent such as PAA, 0.4 wt % bioplastic such as PEO and 13 wt % glycerol as a plasticizer;

9. A composition comprising 37 wt % PVOH of grade type 3, 30 wt % of PVOH grade type 2, 20 wt % PVOH grade type 1, 0.1 wt % crosslinking agent such as PAA, 0.4 wt % bioplastic such as PEO and 13 wt % glycerol as a plasticizer;

10. A composition comprising 61 wt % PVOH of grade type 3, 30 wt % of PVOH grade type 2, and 9 wt % glycerol as a plasticizer;

11. A composition comprising 57 wt % PVOH of grade type 3, 30 wt % of PVOH grade type 2, and 13 wt % glycerol as a plasticizer;

12. A composition comprising 53 wt % PVOH of grade type 3, 30 wt % of PVOH grade type 2, and 18 wt % glycerol as a plasticizer;

13. A composition comprising 40 wt % PVOH of grade type 3, 30 wt % of PVOH grade type 2, 20 wt % PVOH grade type 1, and 10 wt % glycerol as a plasticizer;

14. A composition comprising 36 wt % PVOH of grade type 3, 30 wt % of PVOH grade type 2, 20 wt % PVOH grade type 1, and 14 wt % glycerol as a plasticizer.

Compositions of the invention may be used as resins in the polymer industry. The composition may be converted into a stock form that comprises a preselected selection of materials, in amounts and amount ratios suitable for producing a particular polymeric product. One such stock material is a pellet or a solid particulate material (such as beads) which may be used as such in the manufacturing of the final polymeric product, e.g., polymeric films or polymeric sheets. The pellet or the particulate solid form may be produced by compounding of a composition of the invention under preselected conditions. Through the compounding processes, the composition or resin is converted into a form having properties that make it more effective, efficient and uniform and ready for further processing through processes including, e.g., molding or extrusion. The pellets may have any shape, but typically are small, columnar, or cylindrical bodies having flat surfaces such as cubes, rectangular parallelepipeds, etc. The pellets are formed from a homogeneous mixture of the composition of the invention processed as disclosed herein.

Thus, the invention further provides a pellet or a solid material (e.g., beads) formed from a composition of the invention or comprising a composition of the invention.

In some embodiments, the pellet obtained by compounding a composition of the invention comprises crosslinked PVOH. In some embodiments, crosslinking comprises crosslinking between PVOH grades; between PVOH and glycerol; between PVOH, glycerol and other components present in the composition.

In some embodiments, compounding comprises thermally treating a composition of the invention to cause one or more of:
 blending of the PVOH grades between themselves and with additives;
 plasticization of PVOH forming hydrogen bonds between PVOH and glycerol;
 crosslinking between the PVOH grades; and/or between the PVOH grades and glycerol; and/or
 volatilization of water or other components that are volatile under these conditions.

The invention further provides a process of manufacturing a pellet from a composition of the invention, the process comprising compounding the composition under conditions selected to convert the composition into a solid particulate material.

In some embodiments, the conditions include converting the composition into a molten state, further causing evaporation or partial evaporation of volatiles. The compounding may thus be carried out by extrusion, e.g., on an extruder such as a twin-screw extruder.

In some embodiments, the twin-screw extruder is a co-rotating or counter-rotating extruder.

In some embodiments, compounding comprises use of a kneader and/or a mixer.

In some embodiments, the compounding is achievable by heating the composition, followed by exposing the melt to a rapid decompression. In some embodiments, the compounding may be carried out on a twin-screw extruder equipped with a devolatilization system suited for causing unreacted monomers, solvent, water, dissolved gases, or other undesirable volatile materials to be removed from a polymer melt.

Pellets or solid particulate materials formed by compounding compositions of the invention may be used in manufacturing of a polymeric object, e.g., polymeric films or sheets, by further processing the pellet or solid particulate material by, e.g., molding or extrusion. Thus, in another aspect of the invention, there is provided use of a composition of the invention for manufacturing a polymeric product, such as a polymeric film or a polymeric sheet.

The invention further provides a process of manufacturing a polymeric product such as a film or a sheet, wherein the process comprises transforming, e.g., by molding or extruding, a compounded form of a composition of the invention into the polymeric product.

In some embodiments, the process comprises extruding a compounded form of a composition of the invention.

In some embodiments, the compounded form of the composition is a pelletized form.

In some embodiments, the pelletized form is obtained by compounding as disclosed herein. In some embodiments, compounding is carried out by converting the composition into a molten state, further causing evaporation or partial evaporation of volatiles. The compounding may be carried out by extrusion, e.g., on an extruder such as a twin-screw extruder. In some embodiments, the twin-screw extruder is a co-rotating or counter-rotating extruder. In some embodiments, compounding comprises use of a kneader and/or a mixer. In some embodiments, the compounding is achievable by heating the composition, followed by exposing the melt to a rapid decompression. In some embodiments, the compounding may be carried out on a twin-screw extruder equipped with a devolatilization system suited for causing unreacted monomers, solvent, water, dissolved gases, or other undesirable volatile materials to be removed from a polymer melt.

In some embodiments, the process of manufacturing a polymeric product such as a film or a sheet, comprises compounding a composition of the invention into a pellet form and transforming, e.g., by molding or extruding the pellet form, into the polymeric product.

In some embodiments, the process comprises:
 providing a composition according to the invention;
 compounding said composition into a pellet; and
 transforming the pellet into the polymeric product.

The transformation of the compounded form, e.g., pellet, into the polymeric product may be achievable by molding or by extrusion. Depending on the size and shape of the polymeric product, a proper technique may be utilized.

Where the product is a film or a sheet, the transformation may comprise blown film extrusion or cast film extrusion.

In some embodiments, the films or sheets are manufactured by blown film extrusion. In the process, the compounded material of the invention, often in a form of pellets or beads, is loaded into a hopper and fed into a heated barrel with a screw. The pellets are gradually heated to melt the polymer, when the molten material is subsequently extruded through a die. Different dies may be used; one such die is an annular die or a ring-shaped die. The molten polymer enters the die head and air is injected via a hole in the die center to radially inflate the polymer into a thin tube that is many times its extruded diameter. The film thickness and width may be adjusted in order to meet a desired film profile. Following extrusion, the hot tube film is cooled and pulled by, e.g., nip rollers. As the film cools it flattens and transported for further processing.

The blown film extrusion process may be used to produce a wide variety of products, ranging from simple monolayer films to complex multilayer structures used, e.g., in food packaging.

Multilayer films may similarly be manufactured by blown film coextrusion that combines two or more molten polymer materials.

In some embodiments, the films or sheets are manufactured by a cast film extrusion process, whereby differently from the blown extrusion process, the molten polymer is fed through a flat die system to adopt its final flat film shape. For coextrusion, a die system may comprise a die and a feedblock and for a monolayer extrusion a flat die may be used.

The orientation of the polymer film or sheet may be determined or modified by a tenter frame, a double bubble or machine direction orientation.

Once formed, the films can be further modified by roll slitting, coating or printing, and physical vapor deposition to make metallized films. Films can also be subjected to corona treatment or plasma processing and can have release agents applied as desired.

In some embodiments, the films can be thermoformed, stretched, compression molded, and laminated.

In some embodiments, the extruded films are oriented while being stretched.

The oriented films or shrinkable films of the invention can be of any thickness depending on the desired end-use. For some uses, where the films and/or shrinkable films are intended be printed with ink for applications such as labels which can be adhered to substrates such as paper, the thickness of the film may be smaller as compared to shrinkable protective films. In some embodiments, the films have a thickness of between 10 microns and 500 microns, or 25 and 500 microns, or 50 and 500 microns, or 100 microns and 500 microns, 150 microns and 500 microns, 200 microns and 500 microns, 250 microns and 500 microns, 300 microns and 500 microns, 350 microns and 500 microns, 400 microns and 500 microns, or 450 microns and 500 microns.

In some embodiments, the films may be provided in a thickness between 10 microns and 100 microns, 10 microns and 90 microns, 10 microns and 80 microns, 10 microns and 70 microns, 10 microns and 60 microns, 10 microns and 50 microns, 10 microns and 40 microns, 10 microns and 30 microns, 10 microns and 20 microns, 20 microns and 100 microns, 30 microns and 100 microns, 40 microns and 100 microns, 50 microns and 100 microns, 60 microns and 100 microns, 70 microns and 100 microns, 80 microns and 100 microns, 90 microns and 100 microns, 30 microns and 90 microns, 30 microns and 80 microns, 30 microns and 70 microns, 30 microns and 60 microns, or between 30 microns and 50 microns.

In some embodiments, the films may be provided in a thickness between 10 microns and 200 microns, 10 microns and 300 microns, or 10 microns and 400 microns.

The polymeric films of the invention may be used in a wide variety of applications, including packaging, plastic bags, labels, shrinkable labels, electrical fabrication, photographic film, film stock for films, and others.

The combination of improved shrink properties, as discussed herein, with improved polymer stability, yet controlled biodegradability, as discussed below offer new commercial opportunities, including recyclability for shrinkable films applied to containers, plastic bottles, glass bottles, packaging, batteries, hot fill containers, and/or industrial articles as well facile contamination free decomposability.

As generally known in the art, some polymeric films may be oriented and stretched and subsequently quenched so that the polymer chains exhibit a memory effect. The strain developed in the film is released by raising the temperature of the film, thus causing it to shrink. The shrink characteristics are built into the film during its manufacture by stretching it under controlled temperatures to produce orientation of the molecules. Upon cooling, the film retains its stretched condition, but reverts towards its original dimensions when it is heated. When heated around a package, the film will shrink on the surface of the package, wherein the package acts as a mold. Shrink film gives good protection and sometimes excellent clarity.

The ability of polymers to undergo orientation and the extent of shrinking, among other parameters, depend on polymer properties such as its chemistry, level of hydrogen bonding, molecular weight, molecular weight distribution and long chain branching. For example, wide molecular weight distribution and higher molecular weights lead to increased shrinkage. Additionally, the degree of crystallinity, crystalline morphology and rate of crystallization also affect ability of a polymer to undergo orientation and shrinkage.

In the case of PVOH, it is known that the degree of crystallinity is affected by the degree of hydrolysis and the degree of polymerization. A higher degree of hydrolysis, in some cases, leads to a higher level of hydrogen bonding and to a higher shrinkage and shrink force at the price of poorer melt-processability. PVOH of lower degrees of hydrolysis provide better melt-processability. Thus, blending PVOH with different molecular weights and degrees of hydrolysis enables a balance between drawability, shrinkage and melt-processability. Combined with optimal film production process, films with shrinkage capabilities of >70% were produced, rendering them suitable for shrink packaging.

Shrink films of the invention can be used to bundle, collate, or over-wrap products for unitization, display esthetics, and/or tamper resistance. A very popularly used product is shrink wrap that may be used for packaging of products.

Thus, the invention further provides a polymeric film manufactured as disclosed herein and having a thermally induced shrink capability.

Also provided is a polymeric film formed of a composition or a combination of PVOH grades according to the invention, wherein the polymeric film exhibits a thermally induced shrinkability.

Also provided is a shrinkable polymeric film according to the invention for use in manufacturing shrinkable articles.

Also provided is a shrink wrap formed of a formulation of the invention, as disclosed herein.

Further provided is a biodegradable (i.e., biodegradable in water, soil etc) shrink polymer or film or wrap according to the invention.

As used herein with regard to films and shrink films of the invention, the term "film" includes both film and sheet, encompasses the commonly accepted meaning in the art. The term includes single layer and multilayer films. The "shrink film" refers to a shrinkable film wherein shrinking is induced by exposure to heat. While the term "film" may refer to flat continuous sheets of a material, the term shrink film equivalently refers to sleeves and labels including wrap around labels, sleeve labels, shrink sleeve labels, and shrink wrap labels.

The shrink films of the invention may have a shrink initiation temperature, namely an onset temperature at which shrinkage occurs, of between 50 and 90° C., 55 and 85° C., or between 60 and 75° C. In some embodiments, the shrink initiation temperature is above 100° C.

In some embodiments, the shrink initiation temperature is between 100 and 200, or 150 and 200° C.

The shrinkage may or may not be gradual. In some embodiments, the shrink films of the invention may have at least 70% shrinkage in the extrusion direction, namely in the machine direction or MD. In some embodiments, the shrink films of the invention exhibit a shrink in the MD direction of between 20 and 85%, or between 20 and 82% or between 30 and 85% or uniquely above 70%.

Films and shrink films of the invention are water degradable or generally biodegradable. In other words, films of the invention will degrade when coming in contact with water in the range of minutes to days. Non-limiting shrink films of the invention are provided in Table 3:

The invention further provides composition comprising glycerol in an amount of 19 wt %, PEG in an amount of 0.4 wt %, PAA in an amount of 0.1 wt %, PVOH of grade type 1 in an amount of 20 wt %, PVOH of grade type 2 in an amount of 30%, and PVOH of grade 3 in an amount of 30%.

The invention further provides a process of manufacturing a pellet from a composition comprising glycerol in an amount of 19 wt %, PEO in an amount of 0.4 wt %, PAA in an amount of 0.1 wt %, PVOH of grade type 1 in an amount of 20 wt %, PVOH of grade type 2 in an amount of 30%, and PVOH of grade 3 in an amount of 30%, the process comprising compounding the composition under conditions selected to convert the composition into a solid particulate material.

In some embodiments, the compounding comprises mixing the composition in a high-speed mixer at 100° C. for 1 hour; feeding the mixture into a co-rotating twin-screw extruder equipped with a devolatizing system and extruding same through round dies at 190-220° C.

In some embodiments, the extrusion parameters such as screw design, rpm and feeding rate were optimized for optimal residence time and mixing inside the extruder.

The emerging polymer strands were passed through an air-cooling system and a pelletizer.

In some embodiments, the pellets are processed into thin films using blown extrusion.

In some embodiments, the orientation of the films was achieved during the film production, while the desired orientation and related shrink properties are controlled by the blow up and draw-down ratios.

TABLE 3

Some of the values used in Table 3 have been rounded up or down, as acceptable; thus, the total amount of components in some of the compositions may exceed 100%. Shrink was measured after exposing films to ambient conditions and according to ASTM D2732-14. MD- machine direction; TD- transverse direction.

| | Component Family | | | | | |
|---|---|---|---|---|---|---|
| | A | B | C | D | % shrink MD | % shrink TD |
| | | | Component | | | |
| | PVOH | X-linker | Bioplastic | Additive | | |
| | | | Component spec | | | |
| | PVOH 3 | PVOH 2 | PVOH 1 | PAA | PEO | Glycerol | | |
|---|---|---|---|---|---|---|---|---|
| Composition 1 | 37 | 30 | 20 | 0.1 | 0.4 | 13 | 63 | 33 |
| 2 | 35 | 30 | 20 | 0.1 | 0.4 | 15 | 68 | 21 |
| 3 | 30 | 30 | 20 | 0.1 | 0.4 | 19 | 75 | 22 |
| 4 | 79 | 10 | 0 | 0 | 0 | 11 | 56 | 0 |
| 5 | 70 | 20 | 0 | 0 | 0 | 10 | 60 | 0 |
| 6 | 61 | 30 | 0 | 0 | 0 | 9 | 78 | 23 |
| 7 | 57 | 10 | 20 | 0.1 | 0.4 | 13 | 12 | 19 |
| 8 | 47 | 20 | 20 | 0.1 | 0.4 | 13 | 23 | 25 |
| 9 | 37 | 30 | 20 | 0.1 | 0.4 | 13 | 57 | 24 |
| 10 | 61 | 30 | 0 | 0 | 0 | 9 | 73 | 40 |
| 11 | 57 | 30 | 0 | 0 | 0 | 13 | 73 | 28 |
| 12 | 53 | 30 | 0 | 0 | 0 | 18 | 70 | 34 |
| 13 | 40 | 30 | 20 | 0 | 0 | 10 | 81 | 25 |
| 14 | 36 | 30 | 20 | 0 | 0 | 14 | 82 | 17 |

DETAILED DESCRIPTION OF EMBODIMENTS

All components were mixed and extruded through round dies at 190-220° C. using a co-rotating twin-screw extruder equipped with a devolatizing system. The extrusion parameters such as screw design, rpm and feeding rate were optimized for optimal residence time and mixing inside the extruder The emerging polymer strands were passed through an air-cooling system and a pelletizer. The resulting pellets were further processed into thin films using blown extrusion. The orientation of the films was achieved during the film production, while the desired orientation and related shrink properties are controlled by the blow up and draw-down ratios.

To apply the film as a shrink package, the film is wrapped around an article that is to be shrink-wrapped and both the film and the article are heated to a certain temperature until the film shrinks around the article.

Properties of the Films

The properties of the resulting films depend on the parameters employed during the film production, i.e. blow up and draw-down ratios. Typically, the films were strong and flexible and compare well to conventional polyethylene shrink film routinely used for shrink applications. Some typical values of the 30-60 µm films may be found in Table 4 below:

TABLE 4

| film properties | | |
|---|---|---|
| Property | Value and units | Test method |
| Elongation at break | 80-400% | ASTM D882-12 |
| Tensile strength | 30-80 MPa | ASTM D882-12 |
| Impact resistance | >180 g | ASTM D5420-16 |
| Puncture resistance | >2.5 kgf | ASTM D2852-16 |
| Seal (load) | >20 N | ASTM F88/F88M-15 |
| Water degradation | Fast-slow | Internal test. |

Water degradation is characterized by time required to dissolve a film of a given thickness at given temperature under agitation.

The invention claimed is:

1. A polymeric composition comprising
   a) two or more, or three or more PVOH grade types in an amount ranging between 30 and 99 wt %;
   b) at least one crosslinking compound in an amount ranging between 0 or 0.1 and 20 wt %;
   c) at least one bioplastic in an amount ranging between 0.1 and 50 wt %; and
   d) at least one additive in an amount ranging between 0.1 and 20 wt %.

2. A polymeric composition or polymeric blend comprising at least one plasticizer and PVOH, wherein the PVOH is a combination of three or more PVOH grade types, each grade type having a degree of hydrolysis ranging between 86 and 99% and a degree of polymerization ranging between 500 and 3000.

3. The composition according to claim 2, wherein three of the PVOH grade types are:
   PVOH grade type 1 having a degree of hydrolysis between 98 and 99% and a degree of polymerization of between about 800 and 1700;
   PVOH grade type 2 having a degree of hydrolysis between 86 and 89% and a degree of polymerization of between about 1400 and 2600; and
   PVOH grade type 3 having a degree of hydrolysis between 86 and 89% and a degree of polymerization of between 500 and 800.

4. The composition according to claim 2, wherein the at least one plasticizer is selected from glycerol, sorbitol, a propylene glycol, a polyethylene glycol, and combination thereof.

5. The composition according to claim 2, the composition further comprising at least one crosslinking compound, at least one bioplastic and optionally at least one additive.

6. The composition according to claim 2, the composition comprising:
   a) at least one crosslinking compound in an amount ranging between 0 or 0.1 and 20 wt %;
   b) at least one bioplastic in an amount ranging between 0.1 and 50 wt %; and
   c) at least one additive in an amount ranging between 0.1 and 20 wt %.

7. The composition according to claim 2, comprising three or more PVOH grade types comprising
   at least one PVOH grade type 1 characterized by one or more of
      (i) a degree of hydrolysis between 98 and 99%;
      (ii) a degree of polymerization of between about 800 and 1700; and
      (iii) a molecular weight of between 35 and 75 KDa;
   at least one PVOH grade type 2 characterized by one or more of
      (i) a degree of hydrolysis between 86 and 89%;
      (ii) a degree of polymerization of between about 1400 and 2600; and
      (iii) a molecular weight of between 60 and 120 KDa;
   at least one PVOH grade type 3 characterized by one or more of
      (i) a degree of hydrolysis between 86 and 89%;
      (ii) a degree of polymerization of between 500 and 800; and
      (iii) a molecular weight of between 22 and 35 KDa.

8. The composition according to claim 2, comprising
   (a) three PVOH grades:
      a single PVOH of grade type 1 characterized by
      (i) a degree of hydrolysis between 98 and 99%;
      (ii) a degree of polymerization of between about 800 and 1700; and
      (iii) a molecular weight of between 35 and 75 KDa;
      a single PVOH of grade type 2 characterized by
      (i) a degree of hydrolysis between 86 and 89%;
      (ii) a degree of polymerization of between about 1400 and 2600; and
      (iii) a molecular weight of between 60 and 120 KDa;
      a single PVOH of grade type 3 characterized by
      (i) a degree of hydrolysis between 86 and 89%;
      (ii) a degree of polymerization of between 500 and 800; and
      (iii) a molecular weight of between 22 and 35 KDa;
   (b) at least one crosslinking compound,
   (c) at least one bioplastic and
   (d) at least one additive.

9. The composition according to claim 2, comprising a crosslinking compound selected from polymers, copolymers and nonpolymeric materials, each of which having a functionality capable of associating to OH functionality present in PVOH.

10. The composition according to claim 9, wherein the crosslinking compound is provided with functionality selected from alcohols, epoxides, anhydrides, carboxylic acids, amines, amides, glycidyl functionalities, aldehyde functionalities, and esters.

11. The composition according to claim 2, comprising
 (a) three or more PVOH grades selected from
  at least one PVOH grade type 1 characterized by one or more of
   (i) a degree of hydrolysis between 98 and 99%;
   (ii) a degree of polymerization of between about 800 and 1700; and
   (iii) a molecular weight of between 35 and 75 KDa;
  at least one PVOH grade type 2 characterized by one or more of
   (i) a degree of hydrolysis between 86 and 89%;
   (ii) a degree of polymerization of between about 1400 and 2600; and
   (iii) a molecular weight of between 60 and 120 KDa;
  at least one PVOH grade type 3 characterized by one or more of
   (i) a degree of hydrolysis between 86 and 89%;
   (ii) a degree of polymerization of between 500 and 800; and
   (iii) a molecular weight of between 22 and 35 KDa;
 (b) a crosslinking polymer being optionally poly(ethylene-co-acrylic acid);
 (c) a bioplastic selected from poly(ethylene oxide) (PEO), poly(ethylene glycol) (PEG), polycaprolactone (PCL), poly(lactic acid) (PLA), cellulose and cellulose derivatives, starch, thermoplastic starch (TPS), chitosan, polyhydroxyalkanoates (PHAs) and polyhydroxybutyrate (PHB);
 (d) a salt selected from hygroscopic salts and halide salts.

12. A composition or a blend or a mixture comprising at least one plasticizer and three or more PVOH grade types selected from:
 PVOH grade type 1 comprising PVOH having a degree of hydrolysis between 98 and 99% and a degree of polymerization of between about 800 and 1700;
 PVOH grade type 2 comprising PVOH having a degree of hydrolysis between 86 and 89% and a degree of polymerization of between about 1400 and 2600; and
 PVOH grade type 3 comprising PVOH having a degree of hydrolysis between 86 and 89% and a degree of polymerization of between 500 and 800.

* * * * *